April 2, 1957  O. H. SCHWAB  2,787,167
CHANGE SPEED GEAR
Filed March 7, 1952

Inventor:
OTTO SCHWAB
by Edmund H. Parry Jr.
Attorney

United States Patent Office 2,787,167
Patented Apr. 2, 1957

2,787,167
CHANGE SPEED GEAR

Otto Heinrich Schwab, Friedrichshafen-am-Boden See, Germany, assignor to Zahnradfabrik Friedrichshafen Aktiengesellschaft, Friedrichshafen am Boden See, Germany Application March 7, 1952, Serial No. 275,273

Claims priority, application Germany March 7, 1951

1 Claim. (Cl. 74—359)

This invention relates to an improved multi-speed change-speed gear, particularly for motor vehicles, with pairs of wheels in constant mesh and with shift clutches acting by force closure.

The invention has for an object obtaining throughout a gear shift which, as far as possible, is impact-free and force-saving, by providing more favourable conditions, with regard to the progressive ratio, than those obtaining in multi-group gears hitherto employed. At the same time there is the advantage that, while the overall structural length of the gear is relatively small, very few gear wheels are used for a larger number of speeds.

With the foregoing and other objects in view, the present invention consists in a multi-speed change-speed gear having pairs of gear wheels in constant mesh and with shift clutches acting by force closure for shifting the individual speed stages, characterised in that the output shaft consists of two or more parts disposed coaxially to the driving shaft, and that at least two auxiliary shaft trains are provided which consist of a plurality of individual parts adapted to be coupled.

The shift clutches are distributed over the output shaft train and the auxiliary shaft trains in such manner that the parts of the clutches to be moved (shift members and shift sleeves) are in each case guided on that part of the shaft which is the slower when changing from one speed stage to another. By virtue of the foregoing distribution of the shift clutches and appertaining gear wheel pairs, in accordance with a further feature of the invention, when shifting from each gear speed to the next adjacent gear speed, all rotating parts are accelerated or retarded only in accordance with one stage of the progressive ratio. According to a still further feature of the invention, plate clutches may be provided for the shift clutches of the gear of the invention.

The invention will now be described by way of example with reference to a preferred construction of a gear having four pairs of gear wheels in constant mesh, by virtue of which six forward speeds can be obtained, such as is particularly suitable for driving omnibuses. This construction is illustrated diagrammatically in the accompanying drawing in which.

Figures 1, 2:
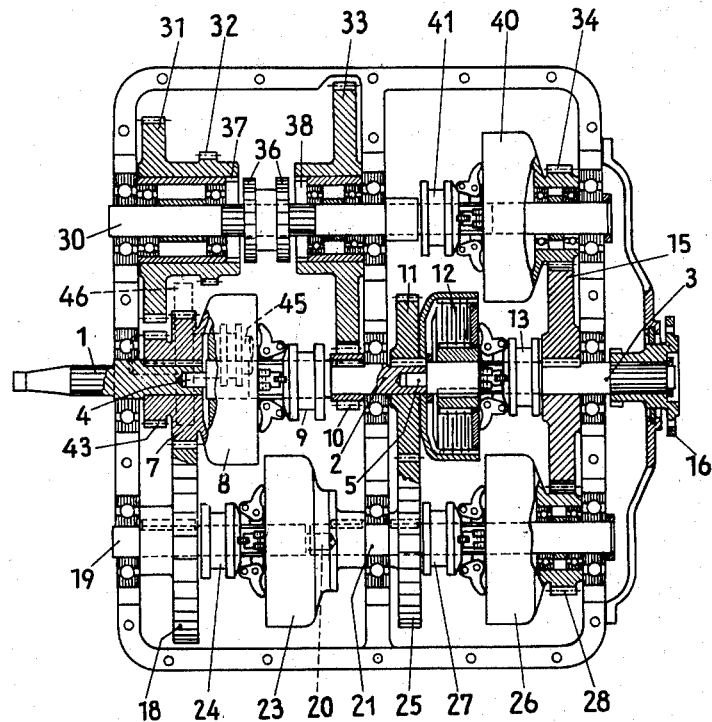
Figure 1 shows the gear in a longitudinal section.
Figure 2 is a diagram illustrating the flow of force in the different speeds.

The main shaft train of the gear consists of a driving shaft 1 and two shaft parts 2 and 3 situated one inside the other. The shaft part 2 is mounted by a journal 4 in the driving shaft, and the shaft part 3, which is mounted by a journal 5 in the shaft part 2, is the output shaft. For the main transmission to an auxiliary shaft train for producing the forward gear speeds, the driving shaft 1 has a gear wheel 7, which is secured to a bell-shaped outer part of a plate shift clutch 8, which serves to connect the shaft part 2 to the driving shaft 1, for which purpose the other parts of the clutch are mounted on the shaft part 2 and a shift sleeve 9 is provided to operate the shift members.

Keyed to the shaft part 2 are gear wheels 10 and 11, while a part of a clutch 12—which serves to connect the shaft part 2 to the output shaft 3—is joined to the wheel 11. Shift sleeve 13 serves clutch 12. Keyed to the output shaft 3 is a gear wheel 15 and, at the outer end of the shaft, a flange 16 is provided for connection of the usual drive shaft.

Two auxiliary shaft trains are provided both of which consist of a plurality of parts. One auxiliary shaft train is driven by a gear wheel 18 which meshes with the gear wheel 7 and is mounted fast on a shaft part 19. The latter is mounted by a journal 20 in a shaft part 21, and both shaft parts can be connected together by a plate clutch 23, having a shift sleeve 24. Keyed to the shaft part 21 is a gear wheel 25 meshing with the wheel 11, and in addition there is a plate clutch 26 with shift sleeve 27 for coupling a gear wheel 28 mounted to be loosely rotatable on the shaft part 21 to the aforesaid shaft part. The wheel 28 meshes with the wheel 15 on the output shaft 3.

The auxiliary second shaft train comprises a continuous shaft 30, a group of gear wheels 31, 32 mounted to run loosely on it, and gear wheels 33 and 34 independently loosely mounted thereon. All these loose gear wheels can be coupled to the shaft 30. For the coupling of the wheel groups 31, 32 on the one hand and for the coupling of the wheel 33 on the other hand to the shaft 30, there is provided a double dog 36 slidable on the shaft 30 by means of keyways and adapted to be inserted into inner claw crowns 37, 38 on the parts to be coupled. For the coupling of the loose wheel 34 there is a plate clutch 40 with shift sleeve 41. The driving shaft 1 has a second wheel 43 which is opposite the wheel 31 mounted loose on the shaft 30. A sliding wheel 46 mounted on a reverse shaft 45 can be brought into mesh with both wheels, in order to provide the reverse drive.

In the six forward gear speeds the transmission takes place as follows:

Transmission in the first speed is effected through the wheels 7, 18, shaft 19, plate clutch 23, wheels 25, 11, wheels 10, 33, clutch 36, 38, shaft 30, plate clutch 40, and wheels 34, 15 to the output shaft 3.

In the second speed the transmission is effected through the plate clutch 8, wheels 10, 33, clutch 36, 38, shaft 30, plate clutch 40, and wheels 34, 15 to the output shaft 3.

For the third speed, the transmission takes place through the wheels 7, 18, shaft 19, plate clutches 23, 26, shaft 21, and through wheels 28, 15 to the output shaft 3.

Transmission for the fourth speed is through the plate clutch 8, wheels 11, 25, shaft 21, plate clutch 26, and wheels 28, 15 to the output shaft 3.

The fifth speed is obtained through the wheels 7, 18, shaft 19, plate clutch 23, wheels 25, 11, plate clutch 12, and output shaft 3.

The sixth speed is a direct drive, which is obtained by closing the plate clutches 8 and 12.

In the couplings the parts to be moved (shift members and sleeves) are guided on that shaft part which when changing over from one speed step to another is the slower.

In the six-speed gear illustrated as an example in Figure 1, and which is particularly designed as a gear for omnibuses, the gear ratios of the wheel pairs correspond to the ratios actually chosen, and with the aid of the diagram in Figure 2 it can be seen that when shifting from each speed to the next adjacent speed all rotating parts are accelerated or retarded in each case only in accordance with one stage of the progressive ratio. The individual stages of the progressive ratio are designated in Figure 2 by $\varphi$, and for each of the gear speeds I to VI the total ratio is indicated. This important success is obtained as a result of the novel distribution of all shift clutches with their appertaining pairs of wheels over the output shaft and all auxiliary shaft trains, and affords the advantage of gear shifting entirely without impact and in a force-saving manner.

I claim:

A multispeed gear transmission comprising a driving shaft having a gear fixed thereto and a friction clutch portion integral with said gear, an intermediate shaft concentric with said drive shaft and having a coacting friction clutch portion and a gear fixed on said intermediate shaft, said intermediate shaft having a second gear fixed thereon integral with a portion of a second friction clutch, a driven shaft concentric with said intermediate shaft and having a gear fixed thereon, a portion of said second friction clutch being fixed on said driven shaft; a countershaft having a gear fixed thereon engaging the gear fixed on said driving shaft, a second countershaft in alignment with said first countershaft and having a gear fixed thereon at all times engaged with said second gear fixed on said intermediate shaft, a third friction clutch intermediate said countershafts, said second countershaft having a gear freely rotative thereon, a fourth friction clutch having a portion integral with said latter freely rotative gear and a portion keyed to said second countershaft, said latter freely rotative gear being at all times engaged with said gear fixed on said driven shaft, a third countershaft having a gear freely rotative thereon at all times engaged with the gear fixed on said intermediate shaft, a second gear freely rotative on said third countershaft and at all times engaged with said gear fixed on said driven shaft, a portion of a fifth friction clutch integral with said second gear on said third countershaft, a clutch portion keyed to said third countershaft and engageable with said latter clutch portion, said latter gear being at all times engaged with said gear fixed on said driven shaft; said gears having predetermined ratios with respect to each other so that, by predetermined engagement and release of selected clutch combinations, speeds in selective ratios may be transmitted from said driving to said driven shaft.

References Cited in the file of this patent
UNITED STATES PATENTS

| | | |
|---|---|---|
| 1,789,271 | Cappa | Jan. 13, 1931 |
| 1,846,532 | Street | Feb. 23, 1932 |
| 1,981,236 | Logue | Nov. 20, 1934 |
| 2,179,171 | Boho | Nov. 7, 1939 |
| 2,204,143 | Myer | June 11, 1940 |
| 2,456,894 | Ryker | Dec. 21, 1948 |
| 2,511,539 | Orr | June 13, 1950 |
| 2,543,412 | Kegresse | Feb. 27, 1951 |
| 2,553,376 | LeTourneau | May 15, 1951 |
| 2,599,801 | Youngren | June 10, 1952 |
| 2,612,787 | Youngren | Oct. 7, 1952 |
| 2,637,221 | Backus | May 5, 1953 |